United States Patent [19]

Inoue et al.

[11] 4,104,610

[45] Aug. 1, 1978

[54] ULTRASONIC WAVE HORN

[75] Inventors: Hiromitsu Inoue, Kyoto; Susumu Katayama; Hiroshi Ohashi, both of Hirakata, all of Japan

[73] Assignee: Matsushita Electric Works, Ltd., Osaka, Japan

[21] Appl. No.: 749,287

[22] Filed: Dec. 10, 1976

[30] Foreign Application Priority Data

| | | | |
|---|---|---|---|
| Dec. 15, 1975 | [JP] | Japan | 50-149809 |
| Jun. 30, 1976 | [JP] | Japan | 51-78069 |
| Jun. 30, 1976 | [JP] | Japan | 51-78075 |

[51] Int. Cl.$^2$ .............................................. H04B 11/00

[52] U.S. Cl. ........................................ 340/15; 181/195; 116/137 R

[58] Field of Search ............. 340/15, 8 MM; 181/142, 181/185, 195; 116/137 R, 137 A, 142 R; 179/115.5 H; 73/632, 642

[56] References Cited

U.S. PATENT DOCUMENTS

| | | | |
|---|---|---|---|
| 1,084,675 | 1/1914 | Tollefson | 116/138 |
| 1,615,434 | 1/1927 | Armstrong | 181/182 |
| 3,103,911 | 9/1963 | Tappan et al. | 116/137 R |

FOREIGN PATENT DOCUMENTS

| | | | |
|---|---|---|---|
| 1,145,526 | 3/1956 | France | 116/137 |

*Primary Examiner*—Maynard R. Wilbur
*Assistant Examiner*—T. M. Blum
*Attorney, Agent, or Firm*—Leydig, Voit, Osann, Mayer & Holt, Ltd.

[57] ABSTRACT

An ultrasonic wave horn adaptable to any desired radiation pattern varying in length-to-breadth ratio of intended detecting area. The horn comprises at least a horn body having gradually expanding caliber from a constricted throat to an expanded opening which is of a flat shape with an unequal length-to-breadth ratio, and an ultrasonic wave generating source of which wave emitting side is disposed adjacent the constricted throat of the horn body, wherein the constricted throat of the horn body is also of a flat shape having an unequal length-to-breadth ratio and the respective major axes of the flat-shaped constricted throat and expanded opening of the horn body are in a relation of intersecting each other at right angles.

10 Claims, 27 Drawing Figures

ULTRASONIC WAVE HORN

This invention relates to ultrasonic wave detecting horns and, more particularly, to improvements in horn element for ultrasonic wave emitters and receivers.

When an existence, position, movement, distance from a specific position and so on of an object are to be detected by means of ultrasonic waves, ultrasonic wave emitter and receiver are used respectively to emit ultrasonic waves in air and to receive reflections from the object as well as any other foreign ultrasonic waves. However, it is often necessary to make the directivity characteristics of the emitter and receiver coincide with a wave emission or radiation pattern desired by the user in response to the using conditions.

For example, in an apparatus for detecting whether an object exists in a spatial zone by emitting ultrasonic wave pulses into the space and receiving reflected waves from the object, the object detecting area of the apparatus is solely dependent on the directivity characteristics, that is, the radiation pattern of the emitter or sensitivity pattern of the receiver. Further, in case a flat area varied only in length-to-breadth ratio is desired to be established as a detecting area which requiring a different radiation or sensitivity pattern, that is, in case an area having, for example, a larger breadth but a smaller length is required to be detected, such as in the case of utilizing the ultrasonic wave detecting horn in an automatic door where the area adjacent the door large in the breadth but small in the length must be subjected to the detection, the detecting horn is required to be the one having a radiation or sensitivity pattern coinciding with the shape of the particular area, that is, the horn should have different directivities in the lengthwise and breadthwise directions.

It has been attempted to obtain such required pattern by employing a horn member set in front of ultrasonic wave oscillator as an ultrasonic wave generating source and having a wave emitting port opened, for example, in an elliptic shape so as to be different in the length and breadth. In practice, however, such measure is accompanied by frequently generated minor or side lobes in the directivity characteristics and the measure has not been well practiced to date.

The above shall be described more in detail with reference to accompanying drawings. In conventional ultrasonic wave detecting horns of the kind referred to as shown exemplarily in FIGS. 1A and 1B, the device is provided inside a constricted throat part *a* of a horn member *c* having a substantially elliptic radiating plane at an opening edge *b*, with an ultrasonic wave generating source *d*, and the horn member *c* has varying calibers gradually expanding from the throad part *a* to the opening edge *b* to different extents in respective directions of the major and minor axes of the elliptic opening *b*. When the directivity characteristics in the direction of the major axis of the elliptic opening of this horn member *c* (the relation between respective sound pressures H*h* in the direction of respective line segments intersecting longitudinal axis of the horn member *c* at angles $\alpha$ along the ellipse's major axis substantially at the throat part *a*, as shown in FIG. 1B, and respective said angles $\alpha$) are actually measured, the sound pressure H*h* will be large when the angle $\alpha$ is smaller than a fixed value and, in case the angle $\alpha$ becomes larger than the fixed value, the sound pressure H*h* will be small, as shown in FIG. 1D. However, when the directivity characteristics in the direction of the ellipse's minor axis (the relation between respective sound pressures H$\nu$ in the direction of respective line segments intersecting the horn's longitudinal axis at angles $\beta$ along the minor axis substantially at the throat part *a*, as shown in FIG. 1C, and respective said angles $\beta$) are actually measured, the sound pressure H$\nu$ will be large when the angle $\beta$ is smaller than a fixed value and, even when the angle $\beta$ is larger than the fixed value, the sound pressure H$\nu$ will greatly fluctuate to be repetitively increased and decreased to generate the side lobes with the increase of the angle $\beta$, as shown in FIG. 1E, so that there will be caused such defects that the directivity characteristics in the direction of the ellipse minor axis of the horn member *c* will be deteriorated due to the side lobes and these side lobes will cause even an object located outside the intended detecting area. The present invention has been suggested to remove such defects of the conventional ultrasonic wave horns.

A primary object of the present invention is, therefore, to provide an ultrasonic wave horn having less side lobe in the directivity characteristics of the radiation pattern different in the length-to-breadth ratio.

Another object of the present invention is to provide an ultrasonic wave horn favorable in the composite directivity characteristics by jointly using horn members different in the characteristics.

Other objects and advantages of the present invention shall be made clear upon reading the following description of the invention detailed with reference to certain preferred embodiments thereof shown in accompanying drawings, in which:

FIGS. 1A to 1E are views showing a structure and directivity characteristics of an exemplary conventional ultrasonic wave horn, in which FIG. 1A is a plan view of the ultrasonic wave horn having a conventional elliptic opening, seen on the opening side, FIG. 1B is a sectioned view of the horn taken on line B—B in FIG. 1A, FIG. 1C is a sectioned view of the horn taken on line C—C in FIG. 1B, FIG. 1D is a diagram showing the directivity characteristics of the horn on the sectioned plane of FIG. 1B, that is, in directions of the major axis of the elliptic opening of the horn, and FIG. 1E is a diagram showing the directivity characteristics of the horn on the sectioned plane of FIG. 1C, that is, in directions of the minor axis of the elliptic opening;

Figure 2:
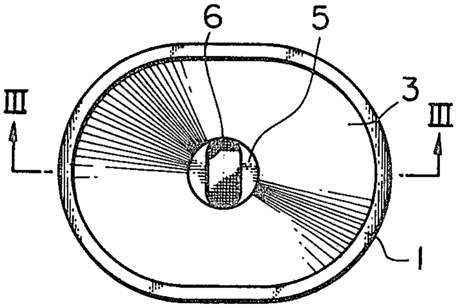
FIG. 2 is an elevation of a first embodiment of the horn of the present invention on its opening side.
Figure 7:
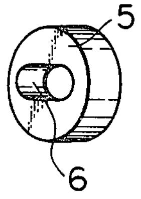
FIG. 7 is a perspective view of a plate member to be used in the embodiment of FIG. 2 for defining constricted throat opening of the horn.
Figure 3:
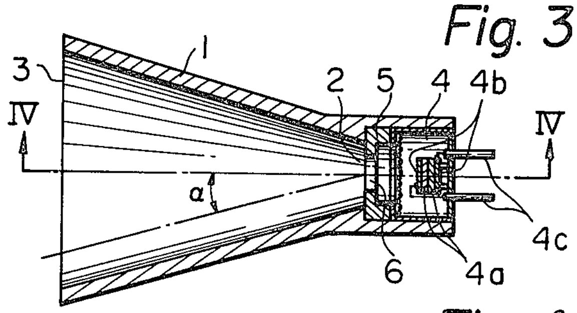
FIG. 3 is a sectioned view of the horn of FIG. 2 on line III—III in FIG. 2.
Figure 4:
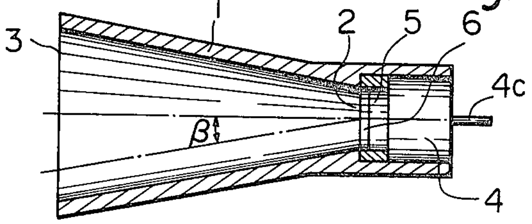
FIG. 4 is a sectioned view of the horn also of FIG. 2 on line IV—IV.

Referring to the first embodiment of the horn according to the present invention with reference to FIGS. 2 to 4, a horn member 1 has a substantially elliptic opening on its wave emitting end side, of which caliber varying as expanded gradually from a constricted circular throat part 2 toward an elliptic opening 3. An ultrasonic wave generating source 4 is provided in the rear or on the opposite side to the opening 3 of the throat 2 and comprises a pair of electrodes **4*b* mounted onto a piezoelectric crystal piece 4*a* so that, when a high frequency voltage is applied through terminals 4*c* between the pair of electrodes, the piezoelectric crystal piece will resonate with the high frequency voltage and will resiliently oscillate to generate ultrasonic waves. A circular plate member 5 having a substantially elliptic central hole 6 as shown in FIG. 7 in a perspective view is provided in the throat part 2 in such manner that the surface plane of the member 5 will be at right angles with the central axis of the horn while the major axis of the hole 6 will be at right angles with the major axis of the elliptic opening 3 of the horn. The shape of the hole 6 of the plate 5** may be not only normally elliptic as illustrated but may also be the one having curves consisting of arcs at respective parts of the major axis and minor axis so long as the hole has the major and minor axes.

Figure 1A:
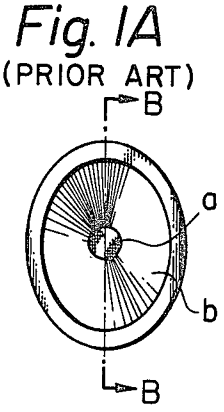
Fig. 1A (PRIOR ART)
Figure 1B:
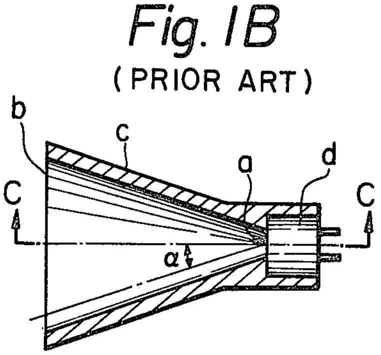
Fig. 1B (PRIOR ART)
Figure 1C:
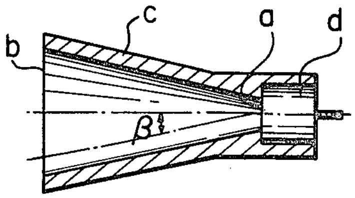
Fig. 1C (PRIOR ART)
Figure 1D:
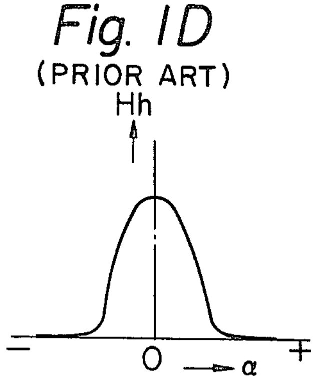
Fig. 1D (PRIOR ART)
Figure 1E:
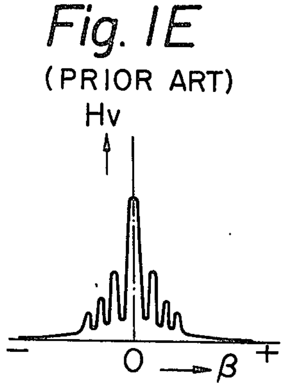
Fig. 1E (PRIOR ART)
Figure 5:
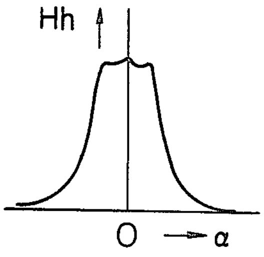
FIG. 5 is a directivity characteristic diagram of the embodiment of FIG. 2 in directions of the sectioned plane of FIG. 3.
Figure 6:
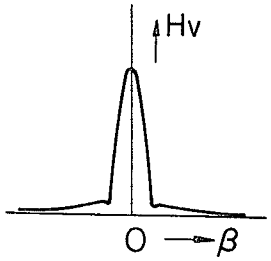
FIG. 6 is a directivity characteristic diagram of the same embodiment in directions of the sectioned plane of FIG. 4.

The directivity characteristics in the directions of the major axis of the elliptic opening 3 of the horn of this embodiment are actually measured and the results are shown in the diagram of FIG. 5. That is, when the absolute value of the angles $\alpha$ of the line components intersecting at the throat part 2 the central axis of the horn member 1 in the ellipse major axis is smaller than a fixed value, the sound pressure H*h* will be large and, when the absolute value of $\alpha$ is larger than the fixed value, the sound pressure H*h* will be small, the same as in the case of FIG. 1. However, the directivity characteristics in the directions of the minor axis of the elliptic opening 3 actually measured as diagramatically shown in FIG. 6 are such that, when the absolute value of the angles $\beta$ of the line components intersecting similarly at the throat part 2 the central axis in the ellipse minor axis is smaller than a fixed value, the sound pressure H$\nu$ will be large and, when the absolute value of $\beta$ is larger than the fixed value, the sound pressure H$\nu$ will be small and generated side ropes of the directivity characteristics in the directions of the ellipse minor axis will be extremely smaller than in the case of FIG. 1D showing the characteristics of the conventional example.

Figure 8:
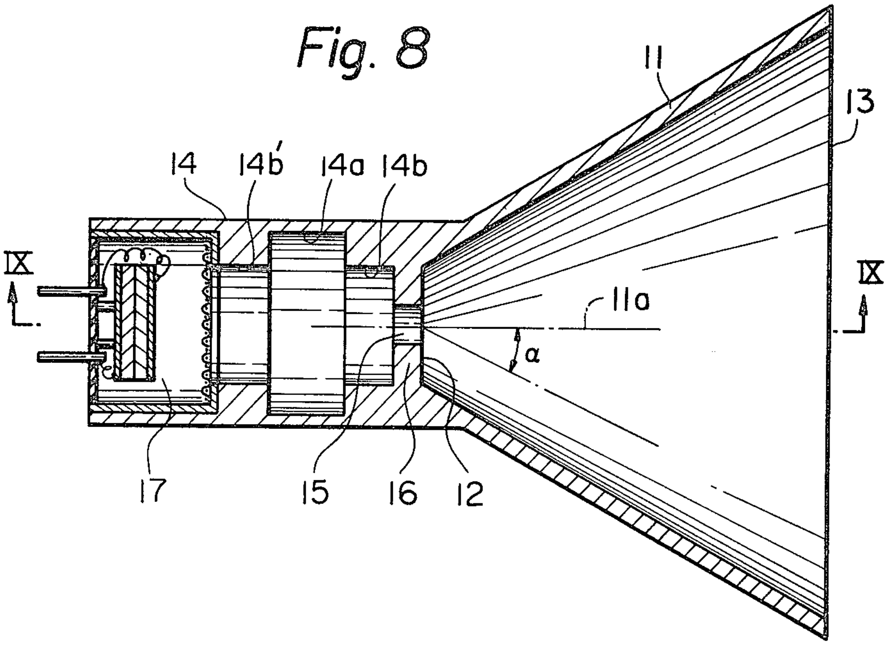
FIG. 8 is a sectioned view of a second embodiment of the present invention taken on a plane including the major axis of the horn's elliptic opening.
Figure 9:
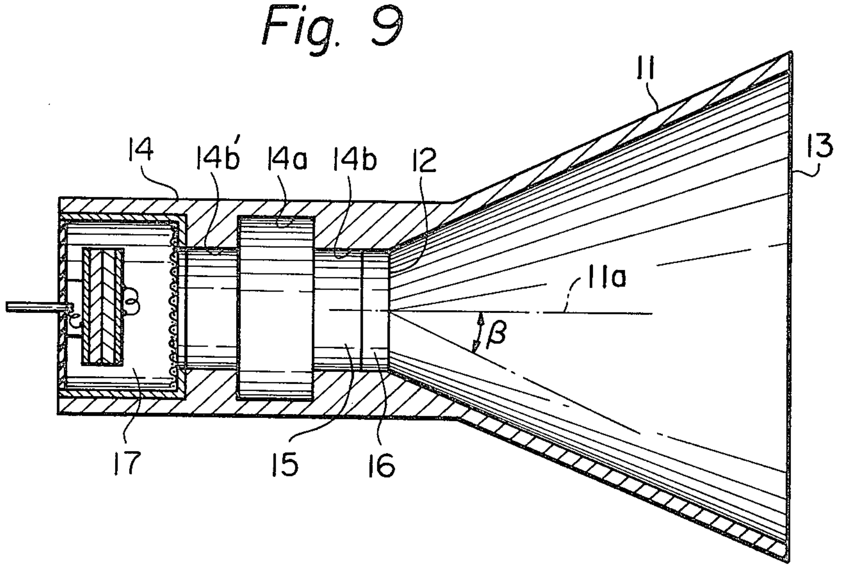
FIG. 9 is a sectioned view taken on line IX—IX of FIG. 8, that is, on a plane including the horn's minor axis of the second embodiment.

Referring next to a second embodiment of the present invention with reference to FIGS. 8 and 9, a horn body 11 has a horn part gradually expanded in the caliber from a constricted throat part 12 which is substantially circular toward an elliptic opening part 13. A cylindrical body 14 is formed integrally with and contiguous to the throat part 12. Within the cylindrical body 14, there are provided a plate part or a barrier 16 having a substantially elliptic central hole 15 at a position contiguous to or in close contact with the throat part 12, a first cylindrical chamber **14*b* having a reduced caliber positioned inside the barrier 16 axially extending toward the rear part of the body 14 opposite to the horn body 11, a second cylindrical chamber 14*a* having an expanded caliber and similarly extending contiguously from the first chamber 14*b*, a third cylindrical chamber 14*b*' having a reduced caliber and similarly extending further contiguously from the second chamber 14*a* and an ultrasonic wave oscillator 17 housed in a rearmost chamber contiguous to the third chamber 14*b*'. The axes of the respective cylindrical chambers 14*b*, 14*a* and 14*b*' are arranged to coincide with the central axis of the horn body 11. The hole 15 in the barrier 16 is substantially elliptic and its major axis coincides with the minor axis of the elliptic opening 13, that is, the respective major axes of the opening 13 and hole 15 are in a relation that they intersect each other at right angles. Therefore, the elliptic hole 15 provides a narrow opening in FIG. 8 of a sectioned view on the major axis of the opening 13, while it provides a wide opening in FIG. 9 of a sectioned view on the minor axis of the opening 13**.

Figure 10:
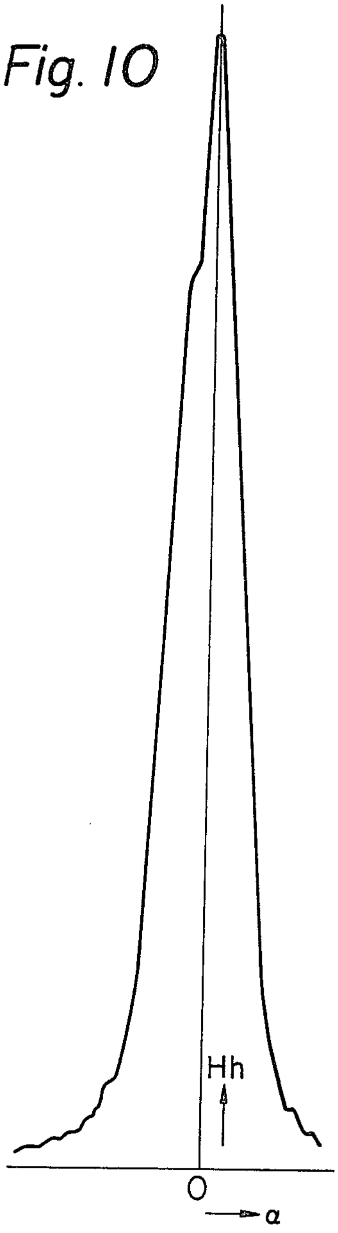
FIGS. 10 and 11 are directivity characteristic diagrams in the directions respectively of the horn's major and minor axes of the second embodiment of FIG. 8.
Figure 11:
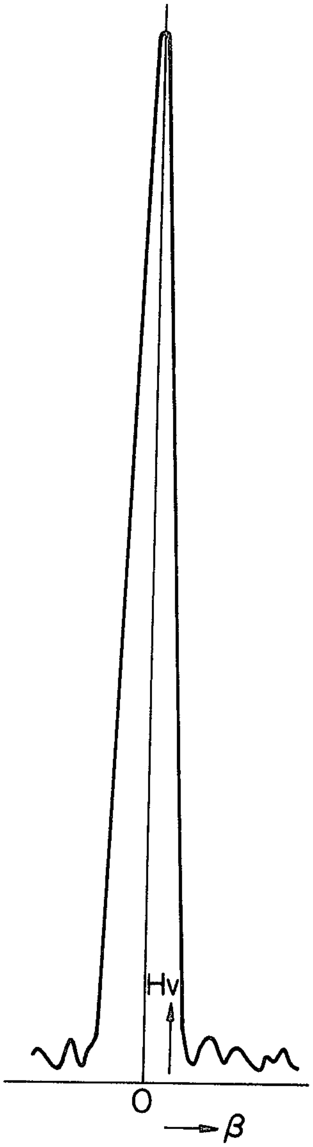

The results of actual measures of the sound pressure H*h* in the directions of the angles $\alpha$ along the major axis of the elliptic wave radiating opening 13 of the horn body 11 in this embodiment are shown in the diagram of FIG. 10, whereas the results of actual measures of the sound pressure H$\nu$ in the directions of the angles $\beta$ along the minor axis of the opening 13 are shown in the diagram of FIG. 11. From these diagrams, it is seen that the directivity characteristics are further improved as compared with those of the first embodiment as shown in FIGS. 5 and 6.

The preferable dimensions of the respective parts in the second embodiment are as follows (where the frequency of the ultrasonic waves of 40 KHz. is employed):

Major axis of the barrier's hole 15: 13 mm.
Minor axis of the barrier's hole 15: 9 mm.
Thickness of the barrier 16: 2 mm.
Axial length of the first caliber reduced chamber **14*b*:** 4 mm.
Internal diameter of the chamber **14*b*:** 13 mm.
Axial length of the second caliber expanded chamber **14*a*:** 6.5 mm.
Internal diameter of the chamber **14*a*:** 18 mm.
Axial length of the third caliber reduced chamber **14*b*':** 4 mm.
Internal diameter of the chamber **14*b*':** 13 mm.

It should be appreciated that these dimensions are to be selected depending on the ultrasonic wave frequency. Thus, when ultrasonic waves of, for example, a wave length λ is employed, the major axis of the hole 15 in the barrier 16 should be approximately 3/2λ and the minor axis of the same should be approximately λ.

Figure 12:
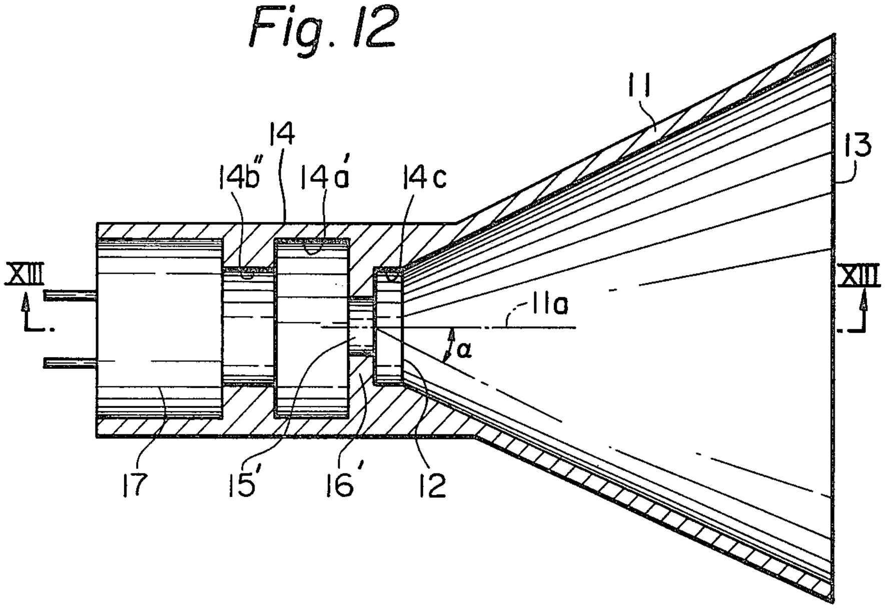
FIG. 12 is a sectioned view of a third embodiment of the present invention taken on a plane including the major axis of the elliptic opening of the horn.
Figure 13:
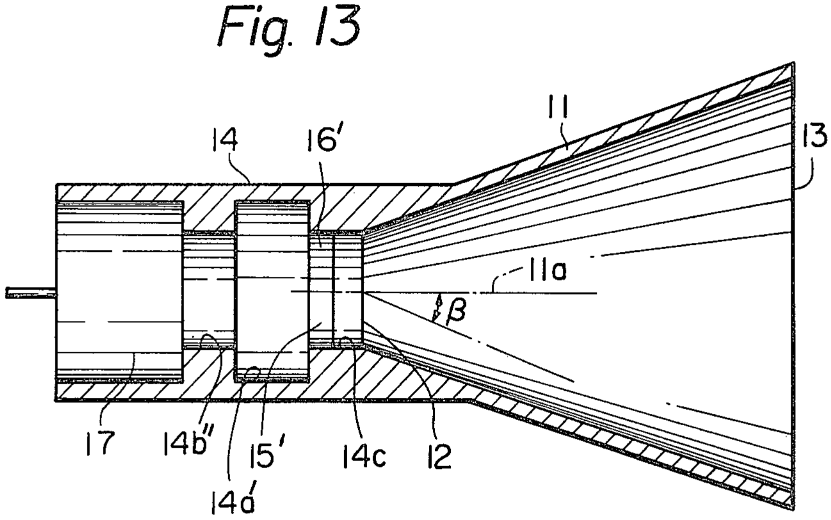
FIG. 13 is a sectioned view taken on line XIII—XIII in FIG. 12, that is, on a plane including the minor axis of the horn's elliptic opening.

In a third embodiment shown in FIGS. 12 and 13, there are provided a cylindrical part 14*c* fully opened toward the elliptic opening 13 and in contact with and contiguous to the throat part 12, a barrier 16' having an elliptic aperture 15' of which major axis is perpendicular to that of the elliptic opening 13 of the horn body 11, an expanded caliber chamber 14*a'* and a reduced caliber chamber 14*b"*, respectively contiguous to one another in the direction reverse to the horn body 11 from the throat part 12.

The preferable dimensions of the respective parts in this third embodiment are as follows:

Axial length of the cylindrical part 14*c:* 2 mm.

Internal diameter of the part 14*c:* 13 mm.

Other parts are of the same dimensions as in the case of FIGS. 8 and 9.

Figure 14:
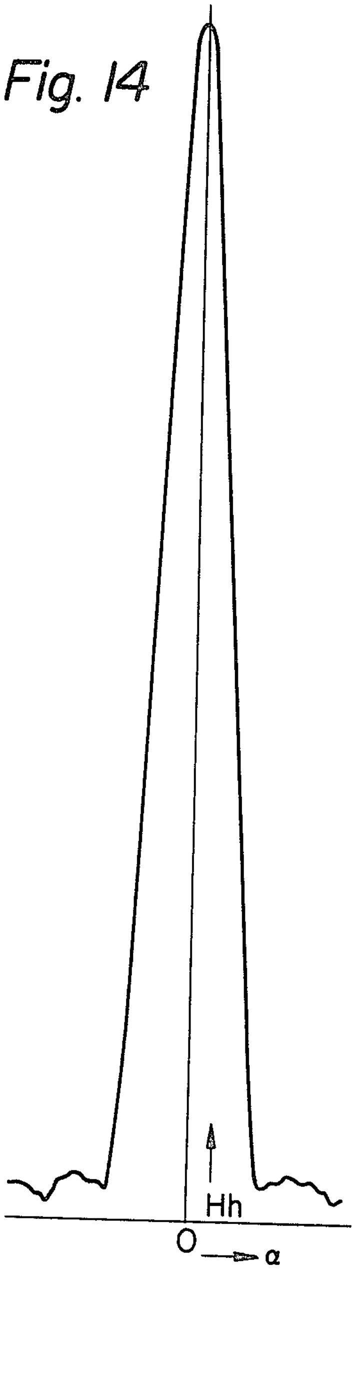
FIGS. 14 and 15 are directivity characteristic diagrams of the third embodiment of FIG. 12 respectively in the directions of the horn's major axis and minor axis.
Figure 15:
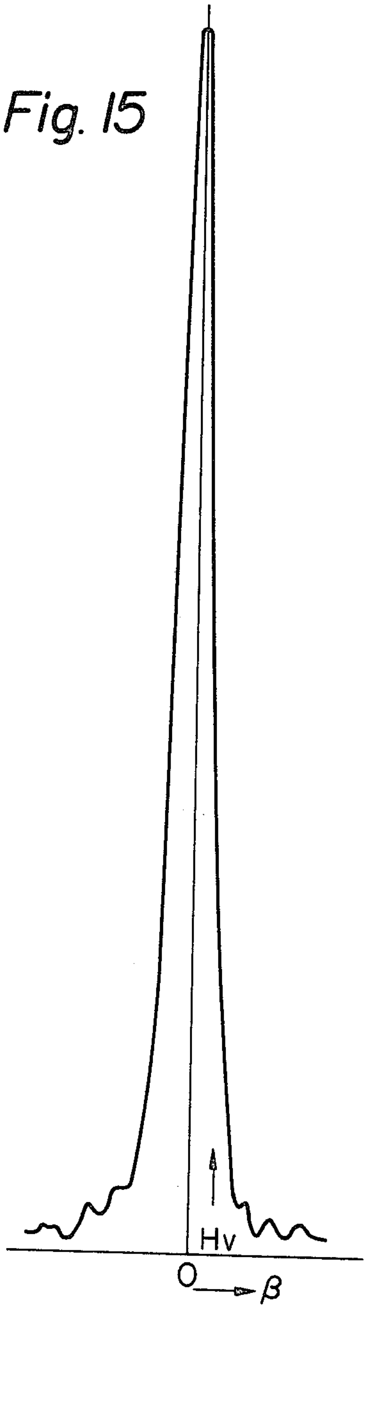

In the case of this third embodiment, the results of actually measuring the sound pressures H*h* and H*v* with respect to the respective angles $\alpha$ and $\beta$ are shown in the diagrams of FIGS. 14 and 15. It is seen that the directivity characteristics are further improved as compared with those in the case of FIGS. 5 and 6.

Figure 16:
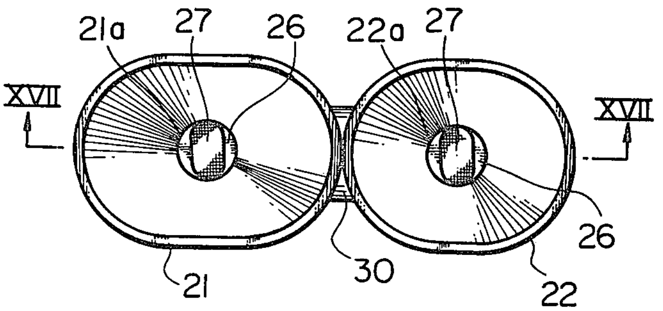
FIG. 16 is a plan view of a fourth embodiment of the present invention seen on the side of the opening edges of a pair of horn members employed therein.
Figure 17:
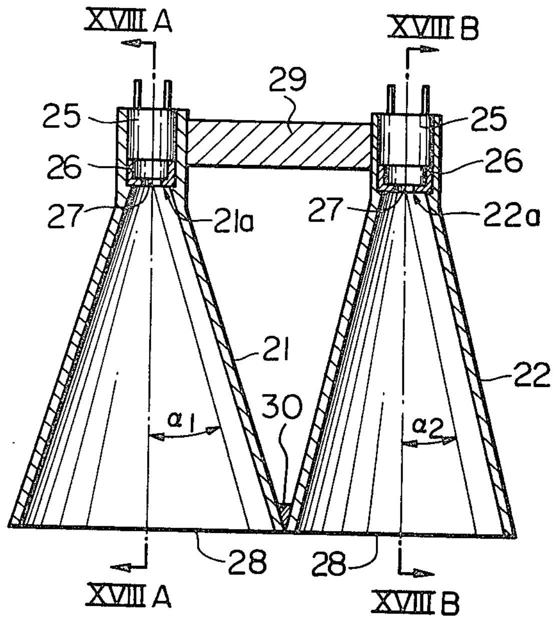
FIG. 17 is a sectioned view of the horn of the fourth embodiment taken on line XVII—XVII in FIG. 16.

References shall be made further to a fourth embodiment of the present invention shown in FIGS. 16 and 17, in which horn members 21 and 22 are elliptic on their wave radiating openings 28 of different major axis as shown in the drawings so as to be respectively different in the directivity characteristics, and in the present instance the horn member 21 is used, for example, to emit the ultrasonic waves but the other horn member 22 is used to receive the reflected waves. In the horn members 21 and 22, 21*a* and 22*a* are respectively throat parts substantially circular, ultrasonic wave oscillators 25 and barrier plates 26 respectively having an elliptic hole 27 are provided inside the throat parts 21*a* and 22*a*. The major axis of the elliptic hole 27 of the respective barriers 26 is arranged at right angles with the major axis of the elliptic wave radiating openings 28 and the minor axis of the hole 27 is arranged at right angles with the minor axis of the openings 28. The two horns are connected to each other by means of a connecting rod 29 at rear parts of the horn members 21 and 22 and a connecting bar 30 at front parts of the horn members.

Figure 18A:
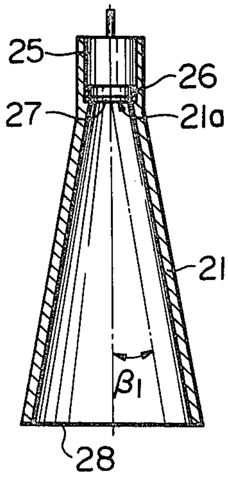
FIGS. 18A and 18B are sectioned views of the horn of the fourth embodiment respectively on lines XVIIIA—XVIIIA and XVIIIB—XVIIIB in FIG. 17.
Figure 18B:
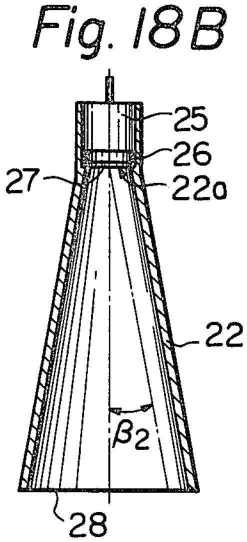

The horn member 21 is thus made to expand at opening angles $\alpha_1$ with respect to the central axis thereof extending from the throat part 21*a* to the opening 28, whereas the horn member 22 is made to expand at opening angles $\alpha_2$ with respect to the similar central axis thereof from the throat 22*a* to the opening 28, as seen in FIG. 17 as sectioned on line XVII—XVII of FIG. 16, that is, along the major axes of the elliptic openings of the respective horn members 21 and 22. The relation between the expanding angles $\alpha_1$ and $\alpha_2$ is $\alpha_1 > \alpha_2$. On the other hand, the horn members 21 and 22 are made to have common opening angles $\beta$ along the minor axes of the elliptic openings, as seen in FIGS. 18A and 18B as sectioned on lines XVIIIA and XVIIIB of FIG. 17.

Figure 19:
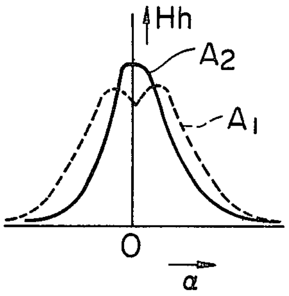
FIGS. 19 and 20 are directivity characteristic diagrams of the horn of the fourth embodiment respectively in the directions of the major axes of the respective horn members employed.
Figure 20:
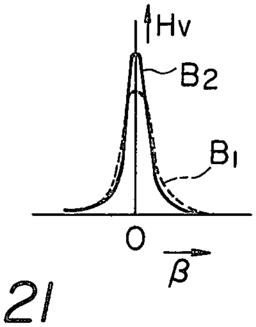
Figure 21:
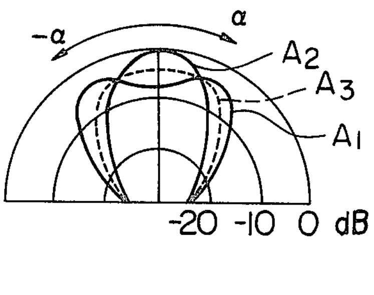
FIG. 21 is a composite directivity characteristic diagram of the fourth embodiment.

The directivity characteristics of the emitted waves in the directions of the angles $\alpha$ of the both horn members 21 and 22 are shown in FIG. 19, in which a dotted line curve $A_1$ represents the characteristics of the horn 21 (relative to the angles $\alpha_1$) and a solid-line curve $A_2$ represents the characteristics of the horn 22 (relative to the angles $\alpha_2$). It is understood here that, in the directions of the angles $\alpha$ along the major axes of the both horn members, the horn member 21 emitting the ultrasonic waves has wider directivity characteristics than the other horn member 22. In the similar manner, the directivity characteristics in the directions of the angles $\beta$ of the both horn members 21 and 22 are shown in FIG. 20, in which a dotted-line curve $B_1$ represents those of the member 21 (the angles $\beta_1$) and a solid-line curve $B_2$ represents those of the member 22 (the angles $\beta_2$). When such horn members as above having different directivity characteristics from each other are used jointly, the result will be the same as a case where a single horn member having directivity characteristics corresponding to the composite directivity characteristics of the two horn members is used for an ultrasonic wave transmitting and receiving horn, of which composite characteristics will be represented, in FIG. 21 of decibel diagram relative to the $\alpha$-angle directions, by an average value curve $A_3$ of dotted-line representation resulting from the respective characteristic curves $A_1$ and $A_2$ of the both horn members 21 and 22 in solid-line representation as given in the decibel diagram.

Figure 22:
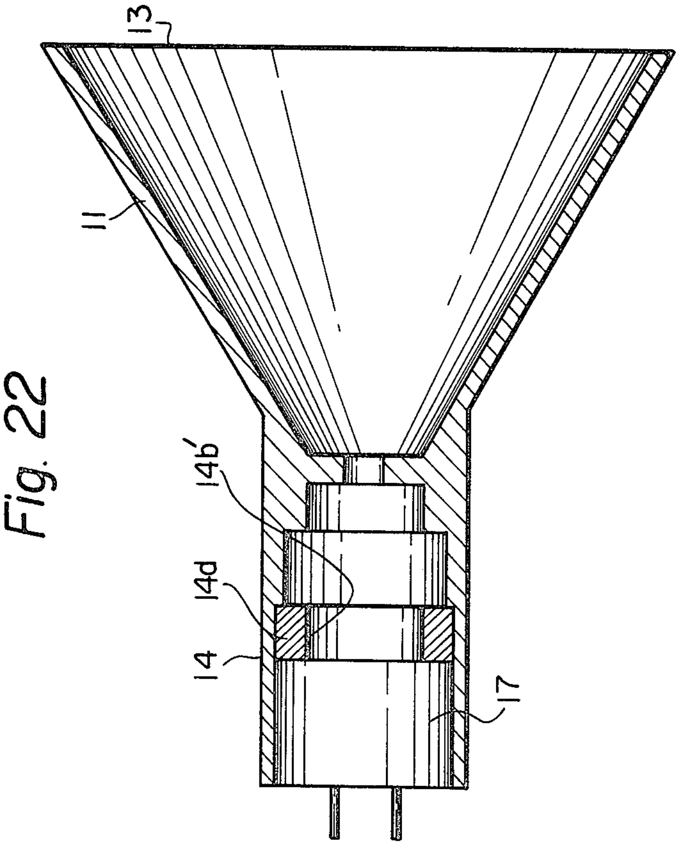
FIG. 22 is a sectioned view of a fifth embodiment of the present invention taken on the major axis of its horn's elliptic opening.

FIG. 22 shows a fifth embodiment similar to the embodiment of FIG. 8, in which a ring member 14*d* is inserted to form the reduced caliber chamber 14*b'*, in order to remove any manufacturing difficulty from such complicated internal structure of the cylindrical horn body 14.

While the present invention has been disclosed in the foregoings mostly with reference to the respective embodiments illustrated in the drawings, the intention is not to limit the invention to the particular embodiments but is rather to include all modifications, alterations and equivalent arrangements of them possible within the scope of appended claims.

Stating simply as examples, the opening of the horn member or body at its expanded wave emitting end and the hole of the plate member or barrier disposed substantially at the constricted throat part of the horn member have been disclosed substantially as being of an elliptic shape, but these apertures may be of any shape other than a normal elliptic shape as long as they are of a shape flattened in one of the lengthwise and breadthwise axes, that is, a shape having unequal length-to-breadth ratio or, in other words, having a longer major axis and a shorter minor axis.

Further, while the constricted throat of the horn member and the plate or barrier member disposed substantially at the throat have been disclosed as being separate components, they may be formed integrally so that the horn member or at least its inner surface will expand from the constricted throat of the elliptic or flattened shape to the expanded wave radiating opening also of the elliptic or flattened shape. In this case, the inner surface of the horn member may be contiguous directly from the constricted throat to the radiating opening but the major axes of the both end elliptic or flattened shapes should be of course in the intersecting relation at right angles to each other.

What is claimed is:

1. An ultrasonic wave horn including an outwardly and uniformly flaring horn body having a constricted throat at one end and an expanded mouth at the other, means defining a transducer cavity adjacent the throat and having a front wall and a back wall, the throat being entirely contained in the front wall, the horn body being unobstructed between the throat and the mouth, an ultrasonic transducer adjacent the back wall of the transducer cavity having electric terminals and for converting between an electrical wave and ultrasonic vibrations, the horn body being oblong in transverse cross section and symmetrical in shape to define major and minor axes, the throat being also oblong in transverse cross section and symmetrical in shape to define major and minor axes, the major axes being arranged at right angles to one another.

2. The combination as claimed in claim 1 in which both the throat and the horn body are generally elliptical in transverse cross section.

3. The combination as claimed in claim 1 in which the horn body flares at a constant rate between the region of the throat and the mouth with the sides of the horn body being substantially straight.

4. The combination as claimed in claim 1 in which the length of the major axis of the throat is substantially equal to the length of the minor axis of the horn body adjacent the throat.

5. The combination as claimed in claim 1 in which the transducer cavity is of cylindrical shape having a longitudinal axis centered on the throat and with the transducer being substantially centered on the longitudinal axis.

6. The combination as claimed in claim 1 in which the transducer cavity includes an antechamber interposed between the throat and the transducer.

7. The combination as claimed in claim 6 in which the antechamber is substantially barrel-shaped, being of greater diameter at its center than at its ends, the cavity, its antechamber, the transducer, throat and horn body all being in substantial axial alignment.

8. The combination as claimed in claim 7 in which the antechamber consists of a series of cylindrical sections of unlike diameter.

9. The combination as claimed in claim 1 in which two of such devices are arranged side by side pointing in the same direction with the transducer of one of them being connected to an ultrasonic oscillator and the transducer of the other being connected to an ultrasonic receiver responsive to reflections of the ultrasonic wave.

10. The combination as claimed in claim 9 in which the included angle of the horn body associated with the oscillating transducer is greater than the included angle of the horn body associated with the receiving transducer.

* * * * *